United States Patent
Jywe et al.

(10) Patent No.: US 7,852,478 B1
(45) Date of Patent: Dec. 14, 2010

(54) DETECTING ASSEMBLY FOR A MULTI-AXIS MACHINE TOOL

(75) Inventors: Wen-Yuh Jywe, Yunlin Hsien (TW); Chien-Hung Liu, Yunlin Hsien (TW); Tung-Hui Hsu, Yunlin Hsien (TW); Chia-Ming Hsu, Yunlin Hsien (TW)

(73) Assignee: National Formosa University, Huwei Township, Yunlin Hsien (TW)

(*) Notice: Subject to any disclaimer, the term of this patent is extended or adjusted under 35 U.S.C. 154(b) by 0 days.

(21) Appl. No.: 12/708,481

(22) Filed: Feb. 18, 2010

(51) Int. Cl.
*G01B 11/00* (2006.01)
(52) U.S. Cl. ............................ 356/400; 356/139.03
(58) Field of Classification Search ............... 356/3.12, 356/138, 139.03, 139.05, 139.06, 139.08, 356/141.2, 141.4, 153, 237.1, 237.2, 388, 356/399, 400, 614, 615, 620; 33/503, 573
See application file for complete search history.

(56) References Cited

U.S. PATENT DOCUMENTS

| | | | |
|---|---|---|---|
| 2,703,505 A * | 3/1955 | Senn ....................... 356/141.3 |
| 5,227,864 A * | 7/1993 | Yowler ...................... 356/400 |
| 7,196,798 B2 * | 3/2007 | Tsai .......................... 356/500 |
| 7,788,814 B2 * | 9/2010 | Collins ....................... 33/286 |

\* cited by examiner

*Primary Examiner*—Gregory J Toatley
*Assistant Examiner*—Michael LaPage
(74) *Attorney, Agent, or Firm*—Pai Patent & Trademark Law Firm; Chao-Chang David Pai

(57) ABSTRACT

A detecting assembly for multi-axis machine tools having a spindle and a turntable and has a detector, a lens device and a computer. The detector is connected to the spindle and has a mounting frame and two detecting segments. The mounting frame is connected to the spindle and has a connecting rod, a bottom board and multiple mounting boards. The detecting segments are mounted on the mounting boards and each has a light source and a sensor. The lens device is mounted on the turntable, extends into the detector and has a supporting shaft and a spherical lens. The spherical lens is mounted on an upper end of the supporting shaft to align light emitted from the light sources with corresponding sensors via the spherical lens. The computer is electrically connected to the detector to receive signals of the detecting segments of the detector and has a signal processor.

13 Claims, 5 Drawing Sheets

DETECTING ASSEMBLY FOR A MULTI-AXIS MACHINE TOOL

BACKGROUND OF THE INVENTION

1. Field of the Invention

The present invention relates to a detecting assembly for multi-axis machine tools, and more particularly to a detecting assembly that can easily measure the accuracy of the multi-axis machine tool and reduce the cost of detecting the errors of the multi-axis machine tool.

2. Description of the Prior Arts

With improvements of manufacturing technology, conventional multi-axis machine tools have been extensive used in machine work. A conventional three-axis machine tool usually has three linear axes to move a work-piece relative to a tool of the conventional machine tool. The conventional multi-axis machine tool may further have multi-rotation axes. For example, a conventional six-axis machine tool has three linear axes (X-, Y- and Z-axes) and three rotation axes (A-, B- and C-axes). The A-axis is rotation around the X-axis, the B-axis is rotation around the Y-axis and the C-axis is rotation around the Z-axis. A conventional five-axis machine tool has three linear axes and two rotation axes. The linear axes and the rotation axes of the conventional multi-axis machine tool can be set with different positions and machining directions to manufacture work-pieces with complicated structures and to provide a preferred working accuracy.

Three conventional detecting assemblies are used to enhance technical grade and process precision of a multi-axis machine tool. The first detecting assembly is a three-degree of freedom detecting assembly that can be used to adjust angles of the rotation axes of the conventional multiple-axis machine. The second detecting assembly is a simple detecting assembly that can be used to detect the X-axis, the Y-axis and the Z-axis of the conventional multiple-axis machine to analyze the errors of the rotation axes. The third detecting assembly is a checking assembly that can detect the errors of the conventional multiple-axis machine by laser adjustment and soft reparation.

Although the conventional detecting assemblies can provide a detecting-correcting effect to the multi-axis machine tool, the structures of the conventional detecting systems are complicated so assembly and the disassembly of the conventional detecting systems is difficult and inconvenient. Then, the cost and time of detecting the errors of the multi-axis machine tool will be increased.

To overcome the shortcomings, the present invention provides a detecting assembly for a multi-axis machine tool to mitigate or obviate the aforementioned problems.

SUMMARY OF THE INVENTION

The main objective of the present invention is to provide a detecting assembly for a multi-axis machine tool, and more particularly to a detecting assembly that can easily detect the errors of the multi-axis machine tool and reduce cost of detecting the errors of the multi-axis machine tool.

The detecting assembly for a multi-axis machine tool having a spindle and a turntable in accordance with the present invention comprises a detector, a lens device and a computer. The detector is connected to the spindle and has a mounting frame, a first detecting segment and a second detecting segment. The mounting frame is connected to the spindle and has a connecting rod, a bottom board and multiple mounting boards. The detecting segments are mounted on the mounting boards and each detecting segment has a light source and a sensor to receive light from the light source. The lens device is mounted securely on the turntable, extends into the detector between the mounting boards and has a supporting shaft and a spherical lens. The supporting shaft is mounted securely on the turntable. The spherical lens is mounted on an upper end of the supporting shaft to align light emitted from the light sources with the corresponding sensors via the spherical lens. The computer is electrically connected to the detector to receive signals outputted from the sensors of the detecting segments of the detector and has a signal processor to calculate and analyze received signals.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
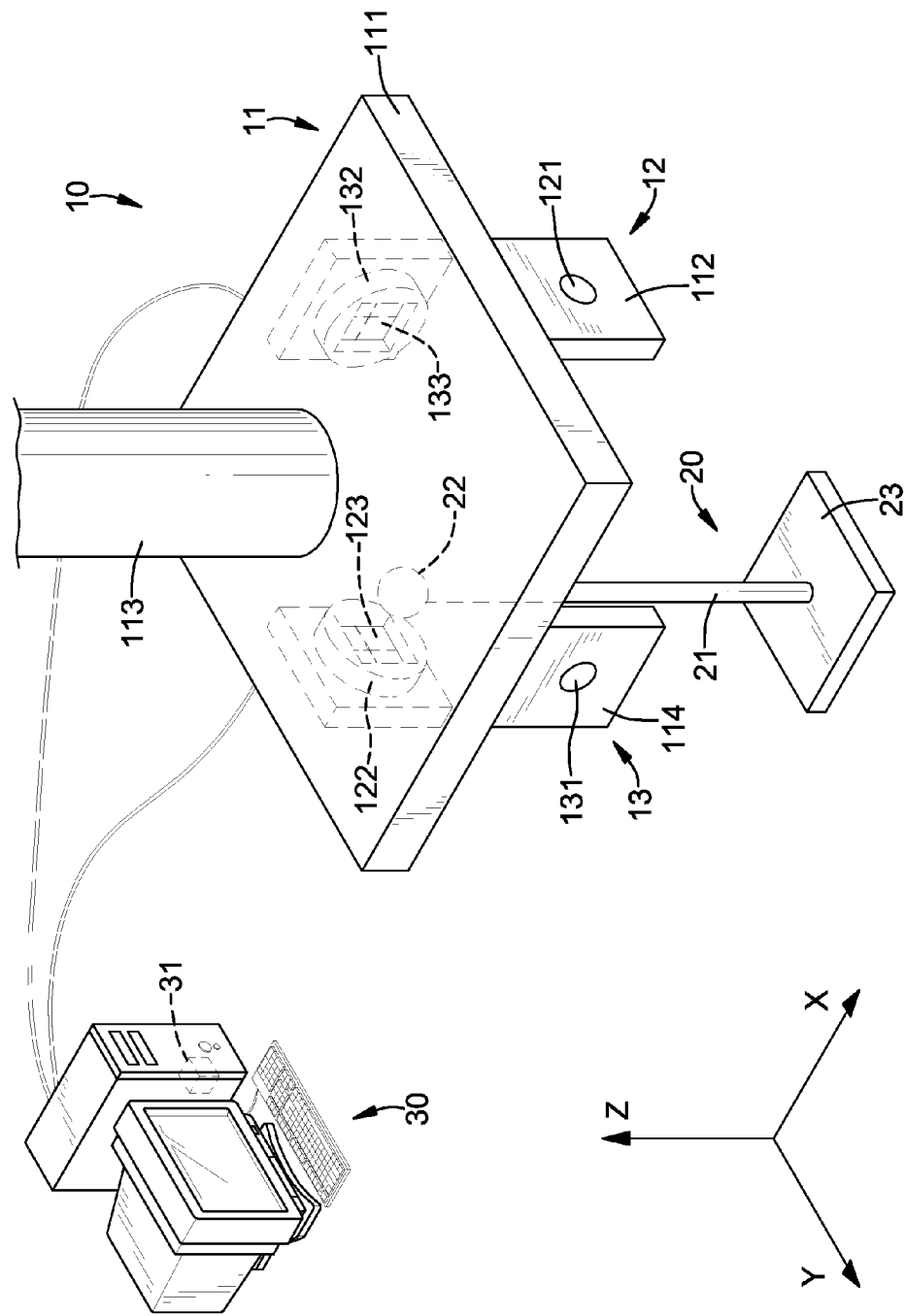
FIG. 1 is a perspective view of a first embodiment of a detecting assembly in accordance with the present invention.

With reference to FIGS. 1 to 4, a detecting assembly for a multi-axis machine tool (50) in accordance with the present invention comprises a detector (10), a lens device (20) and a computer (30). The multi-axis machine tool (50) has three linear axes (X-, Y- and Z-axes), two rotation axes (A- and C-axes), a spindle (51) and a turntable (52). The spindle (51) is defined in the Z-axis of the multi-axis machine tool (50). The turntable (52) is defined below the spindle (51) and is rotates around the Z-axis of the multi-axis machine tool (50).

The detector (10) is connected to the spindle (51) of the multi-axis machine tool (50) and has a mounting frame (11), a first detecting segment (12) and a second detecting segment (13).

The mounting frame (11) is connected to the spindle (51) of the multi-axis machine tool (50) and has a connecting rod (113), a bottom board (111), two first mounting boards (112) and two second mounting boards (114). The connecting rod (113) is connected to the spindle (51) and has a connecting end and a forming end. The connecting end of the connecting rod (113) is inserted into the spindle (51). The bottom board (111) is formed on the forming end of the connecting rod (113) and has a bottom surface facing the turntable (52) of the multi-axis machine tool (50). The first mounting boards (112) are formed on and protrude from the bottom surface of the bottom board (111) and are arranged in a line parallel to the X-axis of the multi-axis machine tool (50), and the first mounting boards (112) have inner faces facing each other. The second mounting boards (114) are formed on and protrude from the bottom surface of the bottom board (111) and are arranged in a line parallel to the Y-axis of the multi-axis machine tool (50) and the second mounting boards (114) have inner faces facing each other.

The first detecting segment (12) is mounted on the mounting frame (11) and has a first light source (121) and a first sensor (122). The first light source (121) is mounted on one of the first mounting boards (112) of the mounting frame (11). Preferably, the first light source (121) emits a collimating beam, a focusing beam, a visible light or an invisible light. The first sensor (122) may be a photoelectric sensor and is mounted on the inner face of another first mounting board (112) that faces the first light source (121) to receive light from the light source and has a receiving surface (123). The receiving surface (123) is formed on the first sensor (122) perpendicular to the first light source (121).

The second detecting segment (13) is mounted on the mounting frame (11) and has a second light source (131) and a second sensor (132). The second light source (131) is mounted on one of the second mounting boards (114) of the mounting frame (11). Preferably, the second light source (131) emits a collimating beam, a focusing beam, a visible light or an invisible light. The second sensor (132) may be a photoelectric sensor and is mounted on the inner face of another second mounting board (114) that faces to the second light source (131) to receive the light source and has a receiving surface (133). The receiving surface (133) is formed on the second sensor (132) perpendicular to the second light source (131).

Figure 5:
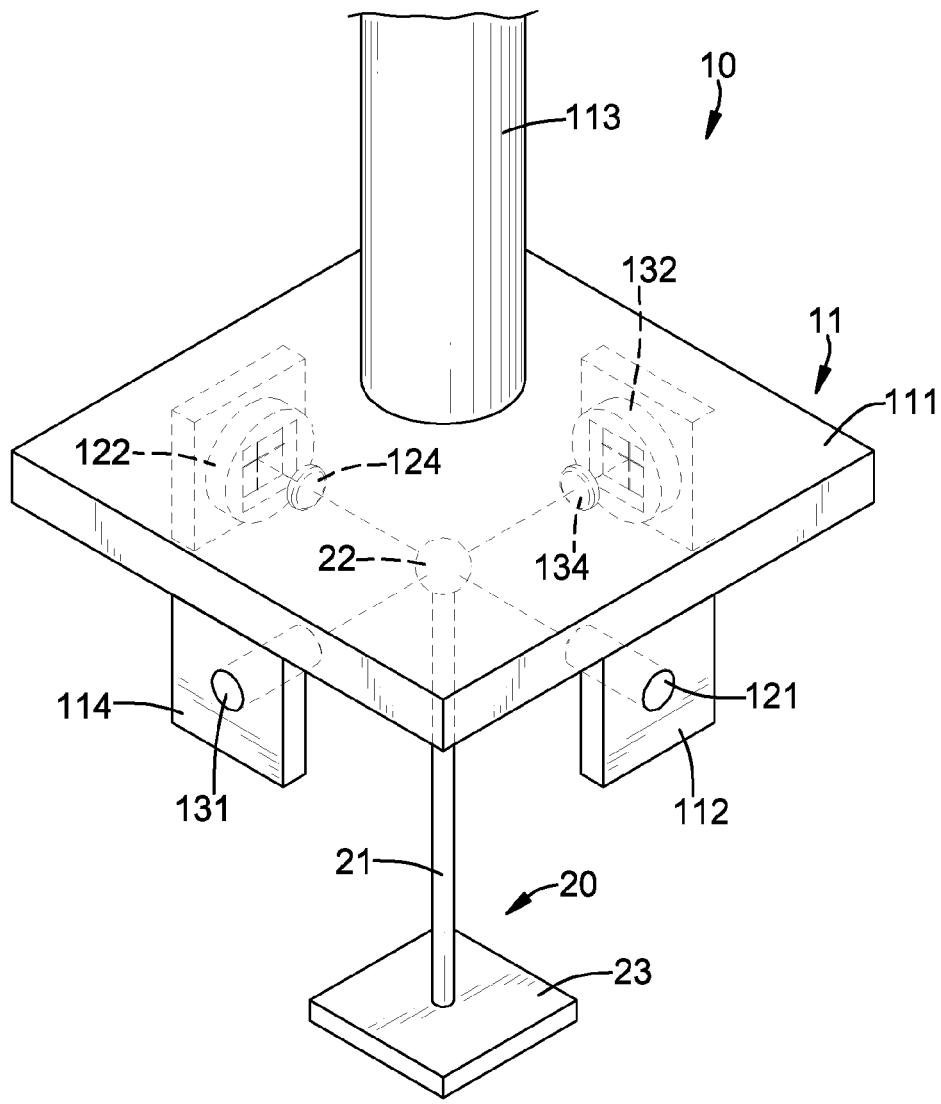
FIG. 5 is a perspective view of a second embodiment of a detecting assembly in accordance with the present invention.

With further reference to FIG. 5, a second embodiment of the detecting assembly for a multi-axis machine tool (50) in accordance with the present invention further comprises two lenses (124, 134). One of the lenses (124, 134) is mounted between the first light source (121) and the first sensor (122) and the other lens (134) is mounted between the second light source (131) and the second sensor (132).

The lens device (20) is mounted securely on the turntable (52) of the multi-axis machine tool (50), extends into the detector (10) between the mounting boards (112) and has a supporting shaft (21) and a spherical lens (22). The supporting shaft (21) is mounted securely on the turntable (52) of the multi-axis machine tool (50) and has a lower end, an upper end and a magnet (23). The magnet (23) is mounted on the lower end of the supporting shaft (21) and is attracted to the turntable (52) of the multi-axis machine tool (50). The upper end of the supporting shaft (21) is extended into the detector (10) between the inner faces of the mounting boards (112, 114). The spherical lens (22) is mounted on the upper end of the supporting shaft (21) so the light sources (121, 131) of the detecting segments (12, 13) emit light to the corresponding sensors (122, 132) via the spherical lens (22).

The computer (30) is electrically connected to the detector (10) to receive signals outputted from the sensors (122, 132) of the detecting segments (12, 13) of the detector (10) and has a signal processor (31) to calculate and analyze received signals.

Figure 2:
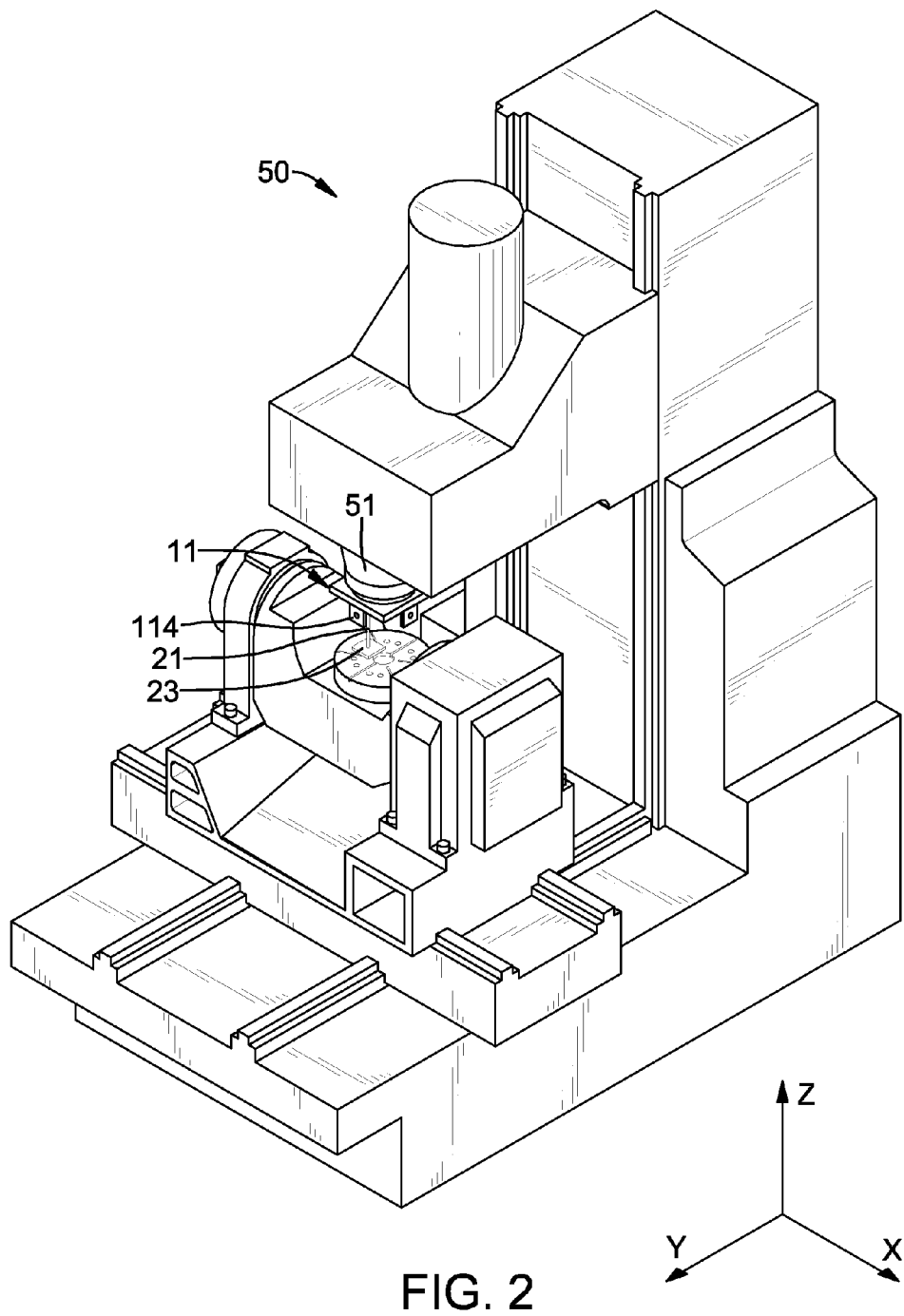
FIG. 2 is a perspective view of the detecting assembly in FIG. 1 mounted on a multi-axis machine tool.
Figure 3:
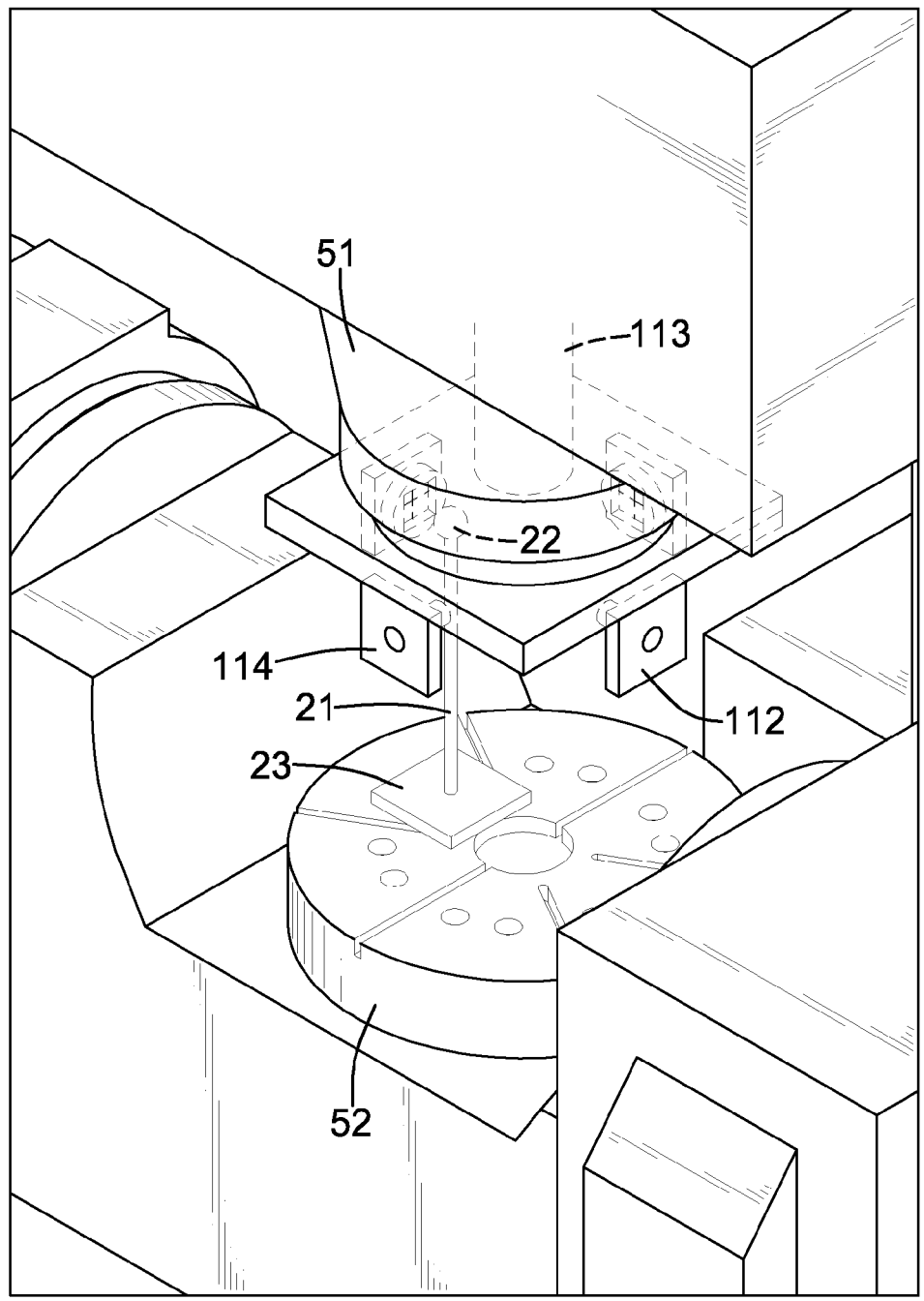
FIG. 3 is an enlarged perspective view of the detecting assembly in FIG. 2.
Figure 4:
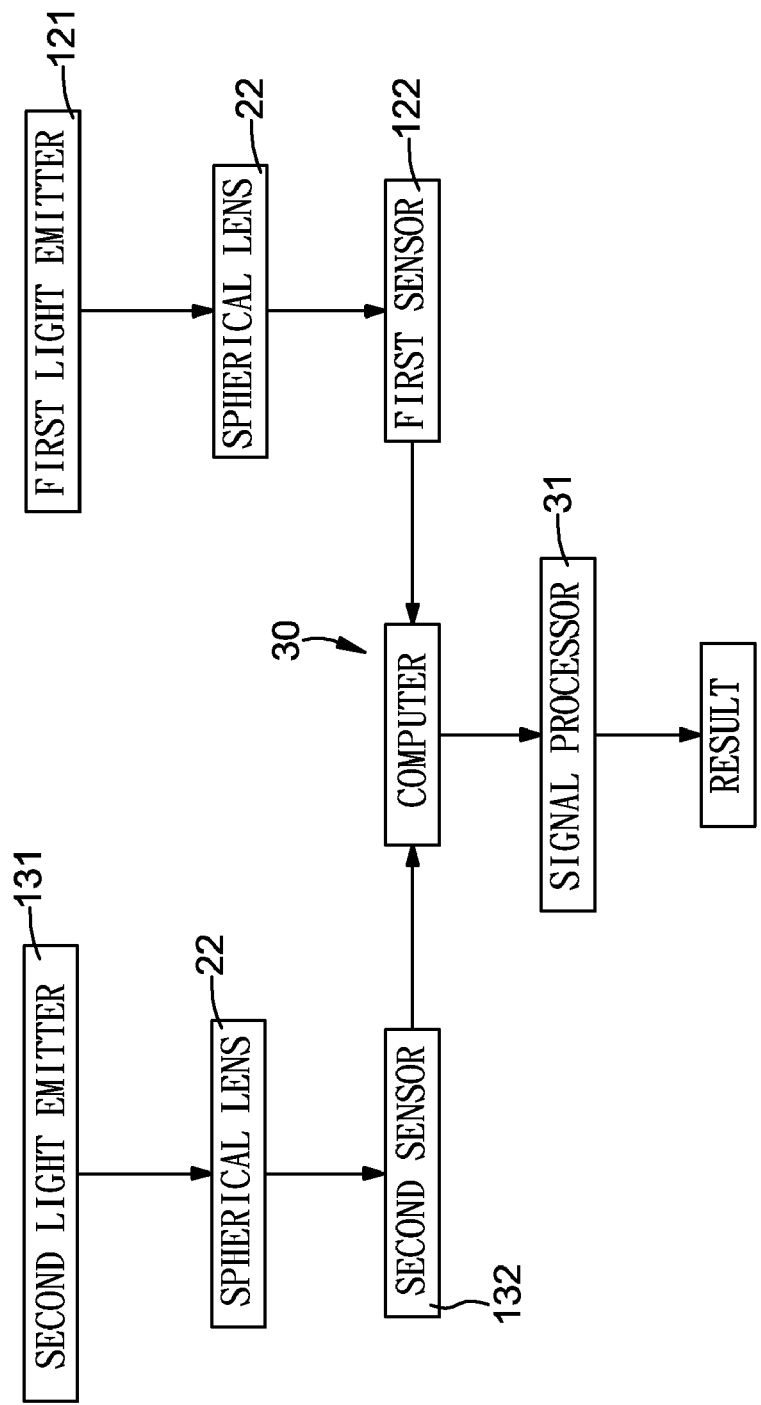
FIG. 4 is a block diagram of the detecting assembly for a multi-axis machine tool in FIG. 1.

With reference to FIGS. 2 and 3, after the detector (10) and the lens device (20) are respectively mounted on the spindle (51) and the turntable (52) of the multi-axis machine tool (50) to hold the spherical lens (22) between the mounting boards (112, 114), the turntable (52) is moved along the X-axis and the Y-axis of the multi-axis machine tool (50) so the light sources (121, 131) emit light through the spherical lens (22) and into the receiving surfaces (123, 133) of the corresponding sensors (122, 132). The receiving surfaces (123, 133) will produce received signals corresponding to the emitting positions of the light sources (121, 131). The received signals will be sent to and calculated and analyzed by the signal processor (31) of the computer (30).

In accordance with the present invention, the first light source (121) emits a light source to the first sensor (122) via the spherical lens (22) and the light source of the first light source (121) is parallel to the X-axis of the multi-axis machine tool (50). When the first light source (121) is off-center from the spherical lens (22), the first sensor (122) can detect signals of Y-axis ($PSD_{1Y}$) and Z-axis ($PSD_{1Z}$). The second light source (131) emits a light source to the second sensor (132) via the spherical lens (22) and the light source of the second light source (131) is parallel to the Y-axis of the multi-axis machine tool (50). When the light source of the second light source (131) is off-center from the spherical lens (22), the second sensor (122) can detect a signal of X-axis ($PSD_{2X}$) and Z-axis ($PSD_{2Z}$).

An offset of the center of the spherical lens (22) can be calculated by the equations as follows:

The offset of the center of the spherical lens (22) in X-axis: $\Delta X = PSD_{2X}$;

The offset of the center of the spherical lens (22) in Y-axis: $\Delta Y = PSD_{1Y}$; and The offset of the center of the spherical lens (22) in Z-axis: $\Delta Z = (PSD_{1Z} + PSD_{2Z})/2$.

When the offset of the center of the spherical (22) is calculated by the aforementioned equations in the signal processor (31) of the computer (30), a signal corresponds to the offset of the center of the spherical lens (22) will send to the multi-axis machine tool (50) to adjust the position of the turntable (52) along the X-axis and the Y-axis of the multi-axis machine tool (50). Therefore, the spherical lens (22) on the turntable (52) can be moved to let align the light sources (121, 131) and the spherical lens (22) for calibration.

Preferably, the detecting assembly in the present invention has two operating types, one of the operating types is fixing the detector (10) and moving the spherical lens (22) relative to the detector (10) to align the light sources (121, 131) through the spherical lens (22) with the corresponding the sensors (122, 132) to calculate the offset of the center of the spherical lens (22). The other operating type is fixing the spherical lens (22) and moving the detector (10) relative to the spherical lens (22) to align the light sources (121, 131) through the spherical lens (22) with the corresponding the sensors (122, 132) to calculate the offset of the center of the spherical lens (22).

After calculating the offset of the center of the spherical lens (22), the errors of the multi-axis machine tool (50) can be analyzed by the signal processor (31) of the computer (30). Furthermore, the detector (10) also can be mounted on the turntable (52) and the lens device (20) can be connected to the spindle (51) of the multi-axis machine tool (50) to find the errors of the multi-axis machine tool (50).

The detecting assembly for a multi-axis machine tool (50) in accordance with the present invention uses the light sources (121, 131), the sensors (122, 132) and the spherical lens (22) to detect the offset of the center of the spherical lens (22) and to analyze the errors of the multi-axis machine tool (50) by the computer (30). In assembly, only the detector (10) needs to be connected with the spindle (51) of the multi-axis machine tool (50) and the lens device (20) mounted on the turntable (52). Then, the detecting assembly is completely assembled on the multi-axis machine tool (50) and this is convenient and timesaving.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A detecting assembly for multi-axis machine tools having three linear axes (X-, Y- and Z-axes), multi-rotation axes, a spindle and a turntable, and the detecting assembly comprising:
a detector having
a mounting frame having
a bottom board having a bottom surface;
two first mounting boards formed on and protruding from the bottom surface of the bottom board and arranged in a line parallel to the X-axis of the multi-axis machine tool, and each first mounting board having an inner face facing each other; and
two second mounting boards formed on and protruding from the bottom surface of the bottom board and arranged in a line parallel to the Y-axis of the multi-axis machine tool, and each second mounting board having an inner face facing each other;
a first detecting segment mounted on the mounting frame and having
a first light source mounted on one of the first mounting boards of the mounting frame; and
a first sensor mounted on the inner face of the other first mounting board that faces to the first light source to receive a light emitted from the first light source and having a receiving surface formed on the first sensor perpendicular to the first light source; and
a second detecting segment mounted on the mounting frame and having
a second light source mounted on one of the second mounting boards of the mounting frame; and
a second sensor mounted on the inner face of the other second mounting board that faces the second light source to receive light emitted from the second light source and has a receiving surface formed on the second sensor perpendicular to the second light source;
a lens device extended into the detector between the mounting boards and having a spherical lens, the light sources of the detecting segments emitting light to the corresponding sensors via the spherical lens; and
a computer electrically connected to the detector to receive signals that outputted from the sensors of the detecting segments of the detector and having a signal processor to calculate and analyze the received signals.

2. The detecting assembly as claimed in claim 1, wherein the mounting frame has a connecting rod formed on and protruding from the bottom board to connect the spindle of the multi-axis machine tool and the connecting rod having
a forming end formed on the bottom board; and
a connecting end adapted to insert in and connect to the spindle; and
the lens device has a supporting shaft extending into the detector between the mounting boards to hold the spherical lens in the detector and having
a lower end adapted to mount securely on the turntable of the multi-axis machine tool;
an upper end extending into the detector between the inner faces of the mounting boards to hold the spherical lens; and
a magnet mounted on the lower end of the supporting shaft to attract with the turntable of the multi-axis machine tool.

3. The detecting assembly as claimed in claim 2, wherein the detecting assembly has two lenses, one of the lenses is mounted between the first light source and the first sensor and the other lens is mounted between the second light source and the second sensor.

4. The detecting assembly as claimed in claim 3, wherein each sensor is a photoelectric sensor.

5. The detecting assembly as claimed in claim 4, wherein each light source emits a collimated beam.

6. The detecting assembly as claimed in claim 5, wherein each light source is a visible light source.

7. The detecting assembly as claimed in claim 5, wherein each light source is an invisible light source.

8. The detecting assembly as claimed in claim 4, wherein each light source emits a focused beam.

9. The detecting assembly as claimed in claim 8, wherein each light source is a visible light source.

10. The detecting assembly as claimed in claim 8, wherein each light source is an invisible light source.

11. The detecting assembly as claimed in claim 4, wherein each light source is a visible light source.

12. The detecting assembly as claimed in claim 4, wherein each light source is an invisible light source.

13. The detecting assembly as claimed in claim 1, wherein the detecting assembly has two lenses, one of the lenses is mounted between the first light source and the first sensor and the other lens is mounted between the second light source and the second sensor.

* * * * *